Oct. 12, 1943.   W. W. MEYER   2,331,615
SEALED COUPLING
Filed June 22, 1942
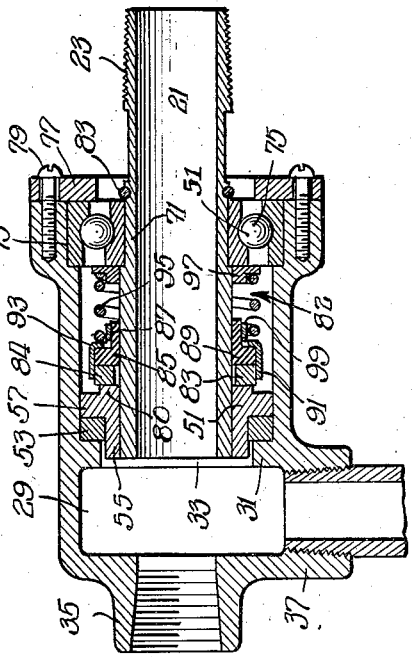
INVENTOR:
Walter W. Meyer,
BY:
Spencer, Marzall, Johnston & Cook
attys.

Patented Oct. 12, 1943

2,331,615

UNITED STATES PATENT OFFICE 2,331,615

SEALED COUPLING

Walter W. Meyer, Arlington Heights, Ill., assignor to Rotary Seal Company, Chicago, Ill., a corporation of Illinois Application June 22, 1942, Serial No. 447,917

13 Claims. (Cl. 285—97.3)

My invention relates in general to seals and sealing and has more particular reference to the provision of means for sealing relatively rotatable, interconnected conduit forming members whereby to provide a sealed rotatable coupling for fluid conduits; and the present application comprises a continuation in part of my copending application Serial No. 279,295, filed June 15, 1939, for improvements in Seal.

An important object of the present invention is to provide for sealing a pipe or conduit within a casing or shell, while providing for relatively rotary movement between the pipe and the casing in order to produce a turnable coupling for fluid conduits.

Another important object is to provide improved means, sealed against leakage, for introducing liquid or other fluids to rotating elements from relatively stationary fluid supply mains; a still further object being to provide for the delivery of cooling liquid, such as water, from a stationary main into a rotating element, such as a drum or roller to be cooled.

Another important object resides in providing a sealed coupling of the character described for delivering fluid between relative rotatable structures forming a supply source and a receiver, said coupling comprising a pair of cooperating relatively rotatable members including a pipe or conduit member extending within a casing or shell member, one member being adapted to receive fluid from the supply source and the other adapted to deliver fluid to the receiver, wherein annular sealing means through which the pipe extends within the casing is employed to form a liquid tight seal between the pipe and casing members while permitting relative rotation thereof.

A further object is to provide coupling means for delivering fluid between relatively rotating elements, including a delivery casing, and means to seal the casing upon a pipe or conduit, including bearing means for supporting the casing and the pipe for turning movement, the one with respect to the other.

Another important object resides in the provision of means for journaling the pipe within the casing to permit relative turning movement between pipe and casing; a further object being to utilize the bearing means in combination with seal elements in the casing for the purpose of sealing the same around the pipe.

Another important object is to provide self-aligning seal means affording adequate sealing at all times, regardless of relative wobble of the casing with respect to the pipe on which it is mounted.

These and numerous other important objects, advantages, and inherent functions of the invention will be fully understood from the following description, which, taken in connection with the accompanying drawing, discloses a preferred embodiment of the invention.

Referring to the drawing:

Figure 1 is a sectional view through sealed delivery means embodying my present invention;

Figure 2 is a sectional view illustrating a modified form of the invention;

Figure 3 is a sectional view showing another form of the invention; and

Figure 4 is an assembly view showing, in perspective, parts forming the seal employed in the structures shown in Figures 1, 2, and 3.

To illustrate the invention, I have shown on the drawing sealed delivery means 11 comprising a rotatable coupling through which fluid may be delivered between relatively rotatable elements, such as a fluid main and a receiver 13. In the illustrated embodiment the receiver 13 comprises a hollow drum having cylindrical wall portions 15 and end walls 17, the drum being suitably supported for rotary movement, as in bearings.

My present invention proposes an improved, simplified coupling for delivering fluid, such as cooling water, to the rotatable receiver from a stationary fluid supply source; and it will be obvious, of course, that the present invention is not in any way restricted to the construction of the receiver or the manner in which it is mounted for rotation.

The coupling of my present invention preferably comprises a pipe or conduit 21 and a housing or casing 27 having a preferably cylindrical cavity receiving one end of the pipe, the other end of which projects outwardly of the casing through an opening therein. Either the casing or the pipe may be connected with the receiver in coaxial alignment with the axis of rotation of the receiver, although in the illustrated embodiments I have shown the preferred arrangement in which the pipe 21 is connected with the receiver. The coupling 11 may be connected with the receiver in any suitable fashion, as by forming the projecting end of the pipe with screw threads 23 adapted to sealingly fit into a threaded opening formed in the receiver 13. Adjacent its threaded end the pipe may be formed with flattened portions 25 forming a means for gripping the pipe, as with a wrench or other tool, in connecting the same with the receiver. If the casing 27 is to be connected with the receiver, a short connecting pipe (not shown) may be secured at one end in a threaded opening formed in a boss 35 on the casing in coaxial alignment with the axis of the pipe 21, the other end of the connecting pipe being threaded and secured to the receiver in open communication therewith. Where the casing is thus connected with the receiver, the projecting end of the pipe 21 will, of course, be connected with the fluid supply source.

The end of the pipe 21 extends within the casing and communicates with a fluid receiving chamber 29 formed within the casing. The casing is formed internally with means forming an annular shoulder 31 between the chamber 29 and the opening through which the pipe 21 extends, said shoulder facing towards said opening. The means forming the shoulder 31 encloses an opening 33 into which the end of the pipe 21 extends in position communicating directly with the chamber 29.

Where the coupling is used with the pipe 21 connected to the receiver 15, the casing may be connected to the liquid supply source by suitable conduit means connected with the casing and opening into the chamber 29 at the boss 35. The casing 27 preferably has an additional boss 37 containing a threaded opening into the chamber 29 in a direction radially of the axis of the pipe 21, so that a fluid supply conduit 39 may be connected with the chamber 29 in either of the bosses 35 or 37, the opening in the unused boss, of course, being suitably plugged with a threaded stopper, or supply conduits may be connected with both bosses, if desired.

As shown in Figure 1, the conduit means 39 comprises a stub pipe 41 tightly threaded in the embossment 37 and having an outwardly projecting portion in position to receive a preferably flexible hose 43, one end of which is secured, as by a suitable clamp 45, upon the projecting end of the stub pipe 41, the other end of the hose 43 being connected with a fluid supply source, such as a stationary water main.

Liquid delivered into the chamber 29 from a fluid supply source through the bosses 35 or 37, or through both bosses, may escape thence through the pipe 21 and into the receiver 13. Likewise, liquid delivered through the pipe 21 into the chamber 29, when the pipe 21 is connected with a fluid supply source, may escape from the chamber through conduits connected in either or both of the bosses 35 and 37.

In order to seal against the escape of liquid from the casing through the opening around the pipe 21, I provide in the casing 27 means for sealing the casing around the pipe and for journaling the pipe within the casing to allow for relative rotation of the pipe and casing.

It will be noted that, by thus journaling the casing on the pipe 21, the casing 27 will be entirely supported and sustained in position on the pipe when the same is connected with the rotary receiver 15; and if the casing is connected directly with the receiver, then the pipe will be entirely supported by the casing. In either case, both the pipe and the casing are supported by the receiver to which the coupling is attached. The casing is thus able to follow any eccentric movement imparted to the pipe during rotation as a result of faulty alignment of the pipe with respect to the axis of rotation of the receiver, or inaccuracies of the bearings on which the receiver is supported. The arrangement thus facilitates and promotes adequate sealing of the conduit within the casing 27 and eliminates the difficulties of sealing the pipe in the casing.

To journal and seal the casing 27 upon the pipe 21, I provide seal means comprising a pair of spaced apart bearings 51 mounted within the casing, the pipe 21 being turnably supported by and within said bearings. The bearings 51 may comprise a pair of bearing sleeves 55, as shown in Figure 1, or may comprise a pair of roller bearings 75, as shown in Figure 3, or I may use a sleeve bearing 55 in combination with a roller bearing 75, as shown in Figure 2. In each case the spaced bearings serve to support the pipe 21 against eccentric wobble within the casing.

As shown in Figures 1 and 2, the sleeve bearings 51 each comprise a cylindrical portion having an annular outstanding flange 57 formed integrally with the cylindrical portion of the bearing at one end thereof. The outer diameter of the cylindrical bearing member 55 is slightly smaller than the diameter of the opening 33, while the inside diameter of said bearings 55 is such that the same may snugly engage and form a journal for the outer surfaces of the pipe 21.

A journal element 51 is assembled with its cylindrical portion 55 extending within the opening 33 in position supporting the inner end of the pipe 21, with a resilient gasket 53 received between the annular flange 57 and the shoulder 31 whereby the bearing element is resiliently supported in the casing by the resilient mounting gasket 53.

In Figure 1 of the drawing I have illustrated a seal embodying two bearing elements 51 mounted on the pipe 21 with the flanged ends 57 of the bearing elements in spaced apart adjacent relationship. The pipe 21 is formed with an outstanding annular flange 59 spaced from the inner end of the pipe a distance equal to the length of a bearing element 55 so that the flange 59 extends between and bears upon the adjacent ends of the elements 51. The flange 59, being thus received between the flanged ends of the bearing elements 51, forms a thrust bearing preventing axial movement of the pipe 21 within the bearings 51.

I prefer, also, to provide a spacing ring 61 of any suitable, preferably metallic, material extending between the peripheral edges of the flanges 57, the ring 61 and the peripheral edges of said flanges 57 fitting snugly within the walls of the casing. The cylindrical portion of the bearing 51 remote from the casing enclosed end of the pipe carries a resilient gasket 53 which extends between said cylindrical portion of the bearing and the inner surface of the casing adjacent the flange 57 of said bearing element. This resilient gasket is held in place between the flanged end of the bearing element and a holding ring 63 of any suitable material. Both of the bearing elements 51 are thus mounted resiliently within the casing 27 by means of the yielding packing elements 53, which preferably comprise rubber-like material, such as neoprene, which is a rubber substitute. The bearing and resilient packing elements and the spacing and retaining elements 61 and 63 are held in place with the packing elements under slight compression by means of a retaining sleeve 65 which presses upon the retaining ring 63, said sleeve 65 fitting within the open end of the casing and being held in place by an annular cap ring 67 which is applied to the end of the housing and held in place in any suitable fashion, as by the holding screws 69.

In the form shown in Figure 2 of the drawing, only one resiliently mounted bearing element 51 is employed. This bearing element is disposed in the opening 33 at the end of the pipe 21 in position supporting the end of the pipe, with a resilient gasket 53 disposed around the cylindrical portion of the bearing element 51 between the flange 57 thereof and the seat forming shoulder 31. The pipe 21, however, is formed with a seat 71 and the casing with a corresponding seat 73 for receiving a roller thrust bearing 75 in the end of the casing. This bearing 75 is retained in place by a cap ring 77 secured in any suitable fashion, as by the holding screws 75 at the end of the casing.

As shown in Figure 3, the shoulder 31 forms a seat for a pair of roller bearings 75 which are secured in the casing between the shoulder 31 and a holding ring 78, which may be secured threadingly, as shown, or otherwise to the casing at the open end thereof. The bearings 75 are thus maintained in spaced relationship between the seat 31 and the holding ring 78 by means of a spacing ring 81 similar to the spacing ring 61.

In each of the embodiments illustrated, leakage from the chamber 29 through the casing around the pipe 21 is prevented by means of a seal assembly 82, which is mounted on the pipe in position to form a running seal with seat forming means 80 secured in the casing. The seat forming means 80, in the Figure 1 embodiment, comprises the annular end surface of the bearing 51 facing the open end of the casing. In the Figure 2 embodiment the seat forming means comprises the annular end of the bearing member 51 facing toward the roller bearing 75. In the Figure 3 embodiment, the seat forming means 80 comprises a disc having a central opening surrounded by an annular seat forming rib, the peripheral edges of the disc fitting snugly within the housing 27 and being supported on the shoulder 31 by means of a resilient mounting gasket 53.

In each embodiment leakage through the casing outwardly of the seat forming means 80 is prevented by the resilient mounting gaskets 53, which being under slight compression, form fluid tight seals, at the same time resiliently mounting the seat forming means 80 in self-aligning fashion. Leakage outwardly of the pipe through the seat forming means 80 is prevented by the seal assembly 82, which in the Figure 1 embodiment, is mounted on the pipe between the seat forming end of the outer bearing 51 and retaining means 97 on the pipe 21, said retaining means comprising a collar secured on the pipe by means of a fastening ring 83.

In the embodiment shown in Figure 2, the seal assembly 82 is mounted on the pipe 21 between the outer seat forming end of the bearing element 51 and a retaining collar 97 which abuts a roller bearing 75, which in turn is retained in its seat 71 on the pipe by a retaining ring 83. In the embodiment illustrated in Figure 3 of the drawing, the seal assembly 82 is mounted on the inner end of the pipe 21 between the seat forming surface of the disc 80 and the retaining collar 97, which is secured on the inner end of the pipe by the retaining ring 83.

In each of the illustrated embodiments the seal means 83 comprises a seal ring 84 of any suitable bearing material, adapted to encircle the pipe 21 in position to bear upon and form a running seal with the seat 80. The seal also comprises an annular sealing gasket of preferably soft, flexible, rubber-like sealing material, such as neoprene, the gasket 85 having a cylindrical portion 87 adapted to snugly and frictionally engage and grip the outer surface of the pipe 21. The gasket 85 also has a preferably integral portion 89 forming an annular outstanding flange at the end of the cylindrical portion 87 in position to overlie the back of the ring 84 to form a seal therewith.

The sealing elements 84 and 85 are preferably, although not essentially, secured together in a fashion to prevent relative rotation therebetween. To this end I provide a preferably sheet metal retaining shell 91 having a cylindrical portion adapted to embrace the peripheral surfaces of the ring 84 and the flange 89 of the gasket. The shell 91 has an inwardly extending flange 93 adapted to overlie the back of the flange 89. The flange 93 of the retaining shell serves as a seat or bearing plate for receiving the thrust of one end of a spring 95 which encircles the pipe 21 and bears at one end upon the back of the flange 89 through the flange 93. The opposite end of the spring 95 bears upon the retaining collar 97 which is held in place upon the pipe 21 by means of the holding ring 83 in the Figure 1 and Figure 3 embodiments and by abutment with the inner race of the bearing 75 in the Figure 2 embodiment, said inner race in turn being secured in position by the holding ring 83.

It will be noted that the resilient sealing gasket 85 has a substantially L-shaped configuration and that the force of the spring 95 is applied to the outer or peripheral portions of the flange 89, which may thus have a substantially diaphragm action to yieldingly support the ring 84 in position to form a running seal with the seat 80.

In order to increase the sealing effect of the cylindrical gasket portion 87 upon the outer surfaces of the pipe 21, a holding band 99 may be applied thereon to squeeze the same tightly upon the pipe.

It will be seen from the foregoing that I have provided adequate spaced bearing means for journaling the casing 27 with respect to the pipe 21, and that I have provided for sealing the assembly against fluid leakage by providing resiliently mounted means forming the seal seat 80 in the casing in position to cooperate with the seal ring 84 yieldingly maintained on the pipe by means of the gasket 85 and normally urged into seating engagement with the means 80 under the influence of the spring 95. Leakage of liquid through the casing around the seat forming means 80 is prevented by the resilient gaskets 53, and leakage along the pipe through the seat forming means is prevented by the running seal between the ring 84 and the seat 80 and by the gasket 85 which, being of elastic, rubber-like material, tightly grips the pipe at its cylindrical portions 87 and also under the influence of the spring 95 sealingly engages the back of the ring 84. Effective sealing tightness is maintained, regardless of relative wobble of the casing with respect to the pipe, by virtue of the yielding support afforded the ring 84 and the seat forming means 80 by the resilient rubber-like gaskets 53 and 85.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. A seal for coupling a pipe and a casing having a cavity defined by cylindrical wall surfaces within the casing and enclosing an end of the pipe, comprising a pair of spaced apart sleeve bearings securable within the cavity in position encircling the pipe, said bearings each comprising flange portions adapted to fit within the cylindrical walls of the cavity and pipe supporting sleeve portions, annular seat forming means carried by one of said bearing members in position forming an annular seal seat around said pipe, an annular seal ring adapted for mounting upon the pipe in position to seat upon and form a running seal with the annular seat, and resilient gasket means frictionally engaging the seal ring and said pipe to drivingly connect and seal the same together.

2. A seal for coupling a pipe and a casing having a cavity defined by cylindrical wall surfaces within the casing and enclosing an end of the pipe, comprising a pair of spaced apart bearings securable within the cavity in position encircling the pipe, said bearings each comprising annular mounting means adapted to fit within the cylindrical walls of the cavity and pipe supporting means carried within said annular mounting means, the pipe supporting means of one bearing comprising a sleeve journal, annular seat forming means supportable in said casing by the annular mounting means of one of said bearings in position forming an annular seal seat around said pipe and between said bearings, an annular seal ring adapted for mounting upon the pipe between said bearings in position to seat upon and form a running seal with the annular seat, and resilient gasket means frictionally engaging the seal ring and said pipe to drivingly connect and seal the same together.

3. A seal for coupling a pipe and a casing having a cavity defined by cylindrical wall surfaces within the casing and enclosing an end of the pipe, comprising a pair of spaced apart bearings securable within the cavity in position encircling the pipe, said bearings each comprising annular mounting means adapted to fit within the cylindrical walls of the cavity and a pipe supporting portion carried within said mounting means, annular seat forming means supportable in said casing by one of said bearing members in position forming an annular seal seat around said pipe, an annular seal ring adapted for mounting upon said pipe in position to seat upon and form a running seal with the annular seat, resilient gasket means frictionally engaging the seal ring and said pipe to drivingly connect and seal the same together, and a resilient mounting ring for yieldingly supporting and sealing the seat forming means in said casing.

4. A seal for coupling a pipe and a casing having a cavity defined by cylindrical wall surfaces within the casing and enclosing an end of the pipe, comprising a pair of spaced apart bearings securable within the cavity in position encircling the pipe, said bearings each comprising annular mounting means adapted to fit within the cylindrical walls of the cavity and a pipe supporting portion carried within said mounting means, annular seat forming means supportable in said casing by one of said bearing members in position forming an annular seal seat around said pipe, an annular seal ring adapted for mounting upon said pipe in position to seat upon and form a running seal with the annular seat, and resilient gasket means frictionally engaging the seal ring and said pipe to drivingly connect and seal the same together, said gasket having a tubular portion encircling and gripping the pipe adjacent the seal ring and an integral annular flange portion engaging the seal ring.

5. A seal for coupling a pipe and a casing having a cavity defined by cylindrical wall surfaces within the casing and enclosing an end of the pipe, comprising a pair of spaced apart bearings securable within the cavity in position encircling the pipe, said bearings each comprising annular mounting means adapted to fit within the cylindrical walls of the cavity and a pipe supporting portion carried within said mounting means, annular seat forming means supportable in said casing by one of said bearing members in position forming an annular seal seat around said pipe, an annular seal ring adapted for mounting upon said pipe in position to seat upon and form a running seal with the annular seat, resilient gasket means frictionally engaging the seal ring and said pipe to drivingly connect and seal the some together, said gasket having a tubular portion encircling and gripping the pipe adjacent the seal ring and an integral annular flange portion engaging the seal ring, and spring means yieldingly pressing the flange portion of the gasket sealingly upon said seal ring.

6. A sealed coupling comprising a pipe and a casing having a cavity enclosing an end of said pipe, said cavity being defined by cylindrical wall surfaces in said casing and having a pipe receiving end opening outwardly of the casing, a pair of spaced apart bearings secured in the cavity in position encircling the pipe, said bearings each comprising outer annular mounting means fitting within the cylindrical wall surfaces of the cavity and an inner pipe supporting portion, annular seat forming means supported in said casing by one of said bearings in position forming an annular seal seat around said pipe, an annular seal ring mounted on said pipe in position to seat upon and form a running seal with said annular seat, and resilient gasket means frictionally engaging the seal ring and said pipe to drivingly connect and seal the same together, said bearings, seat forming means and the spacing ring being secured in the cavity by and between a clamping ring on the casing at the open end of the cavity and an annular shoulder formed on the casing in the cavity in position spaced from and facing toward said open end of the cavity.

7. A sealed coupling comprising a pipe and a casing having a cavity enclosing an end of said pipe, said cavity being defined by cylindrical wall surfaces in said casing and having a pipe receiving end opening outwardly of the casing, a pair of spaced apart bearings secured in the cavity in position encircling the pipe, said bearings each comprising outer annular mounting means fitting within the cylindrical wall surfaces of the cavity and an inner pipe supporting portion, annular seat forming means supported in said casing by one of said bearings in position forming an annular seal seat around said pipe, an annular seal ring mounted on said pipe in position to seat upon and form a running seal with said annular seat, resilient gasket means frictionally engaging the seal ring and said pipe to drivingly connect and seal the same together, said bearings, seat forming means and the spacing ring being secured in the cavity by and between a clamping ring on the casing at the open end of the cavity and an annular shoulder formed on the casing in the cavity in position spaced from and facing toward said open end of the cavity, and a resilient sealing and mounting ring interposed between said shoulder and said seat forming means to yieldingly support the seal seat on said casing.

8. A sealed coupling comprising a pipe and a casing having a cavity enclosing an end of said pipe, said cavity being defined by cylindrical wall surfaces in said casing and having a pipe receiving end opening outwardly of the casing, a pair of spaced apart bearings secured in the cavity in position encircling the pipe, said bearings each comprising outer annular mounting means fitting within the cylindrical wall surfaces of the cavity and an inner pipe supporting portion, annular seat forming means supported in said casing by one of said bearings in position forming an annular seal seat around said pipe, an annular seal ring mounted on said pipe in position to seat upon and form a running seal with said annular seat, and resilient gasket means frictionally engaging the seal ring and said pipe to drivingly connect and seal the same together, said seat forming means comprising a plate having outer edges supported in the casing by one of the bearings and a central opening surrounding the pipe, the plate carrying the seal seat in position to receive the seal ring.

9. A sealed coupling comprising a pipe and a casing having a cavity enclosing an end of said pipe, said cavity being defined by cylindrical wall surfaces in said casing and having a pipe receiving end opening outwardly of the casing, a pair of spaced apart bearings secured in the cavity in position encircling the pipe, said bearings each comprising outer annular mounting means fitting within the cylindrical wall surfaces of the cavity and an inner pipe supporting portion, annular seat forming means supported in said casing by one of said bearings in position forming an annular seal seat around said pipe, an annular seal ring mounted on said pipe in position to seat upon and form a running seal with said annular seat, and resilient gasket means frictionally engaging the seal ring and said pipe to drivingly connect and seal the same together, said seat forming means comprising a plate having outer edges supported in the casing by one of the bearings and a central opening surrounding the pipe, the plate carrying the seal seat in position to receive the seal ring, said seal ring being disposed on the pipe on the side of the plate remote from said bearings.

10. A sealed coupling comprising a pipe and a casing having a cavity enclosing an end of said pipe, said cavity being defined by cylindrical wall surfaces in said casing and having a pipe receiving end opening outwardly of the casing, a pair of spaced apart bearings secured in the cavity in position encircling the pipe, said bearings each comprising outer annular mounting means fitting within the cylindrical wall surfaces of the cavity and an inner pipe supporting portion, annular seat forming means supported in said casing by one of said bearings in position forming an annular seal seat around said pipe, an annular seal ring mounted on said pipe in position to seat upon and form a running seal with said annular seat, and resilient gasket means frictionally engaging the seal ring and said pipe to drivingly connect and seal the same together, said seat forming means comprising a plate having outer edges supported in the casing by one of the bearings and a central opening surrounding the pipe, the plate carrying the seal seat in position to receive the seal ring, said seal being disposed at the enclosed end of said pipe on the side of the plate remote from said bearings.

11. A sealed coupling comprising a pipe and a casing having a cavity enclosing an end of said pipe, said cavity being defined by cylindrical wall surfaces in said casing and having a pipe receiving end opening outwardly of the casing, a pair of spaced apart bearings secured in the cavity in position encircling the pipe, said bearings each comprising outer annular mounting means fitting within the cylindrical wall surfaces of the cavity and an inner pipe supporting portion, annular seat forming means on the inner pipe supporting portions of one of said bearings in position forming an annular seal seat around said pipe, an annular seal ring mounted on said pipe in position to seat upon and form a running seal with said annular seat, and resilient gasket means frictionally engaging the seal ring and said pipe to drivingly connect and seal the same together.

12. A sealed coupling comprising a pipe and a casing having a cavity enclosing an end of said pipe, said cavity being defined by cylindrical wall surfaces in said casing and having a pipe receiving end opening outwardly of the casing, a pair of spaced apart bearings secured in the cavity in position encircling the pipe, said bearings each comprising outer annular mounting means fitting within the cylindrical wall surfaces of the cavity and an inner pipe supporting portion, annular seat forming means supported in said casing by one of said bearings in position forming an annular seal seat around said pipe, an annular seal ring mounted on said pipe in position to seat upon and form a running seal with said annular seat, and resilient gasket means frictionally engaging the seal ring and said pipe to drivingly connect and seal the same together, said gasket comprising a tubular portion encircling and gripping the pipe adjacent the seal ring and an integral annular flange portion engaging the seal ring.

13. A sealed coupling comprising a pipe and a casing having a cavity enclosing an end of said pipe, said cavity being defined by cylindrical wall surfaces in said casing and having a pipe receiving end opening outwardly of the casing, a pair of spaced apart bearings secured in the cavity in position encircling the pipe, said bearings each comprising outer annular mounting means fitting within the cylindrical wall surfaces of the cavity and an inner pipe supporting portion, annular seat forming means supported in said casing by one of said bearings in position forming an annular seal seat around said pipe, an annular seal ring mounted on said pipe in position to seat upon and form a running seal with said annular seat, resilient gasket means frictionally engaging the seal ring and said pipe to drivingly connect and seal the same together, said gasket comprising a tubular portion encircling and gripping the pipe adjacent the seal ring and an integral annular flange portion engaging the seal ring, and a cage having an annular portion engaging the peripheral portions of the seal ring and the flange portion of the gasket to hold the same together, said cage including an inturned rim overlying the ring remote face of said flange portion of the gasket.

WALTER W. MEYER.